United States Patent
McCarter

(10) Patent No.: US 12,063,246 B2
(45) Date of Patent: *Aug. 13, 2024

(54) SECURITY MECHANISMS FOR PREVENTING RETRY OR REPLAY ATTACKS

(71) Applicant: Visa International Service Association, San Francisco, CA (US)

(72) Inventor: Ryan Valdeur McCarter, Carrickfergus (IE)

(73) Assignee: Visa International Service Association, San Francisco, CA (US)

( * ) Notice: Subject to any disclaimer, the term of this patent is extended or adjusted under 35 U.S.C. 154(b) by 255 days.

This patent is subject to a terminal disclaimer.

(21) Appl. No.: 17/505,152

(22) Filed: Oct. 19, 2021

(65) Prior Publication Data

US 2022/0038495 A1 Feb. 3, 2022

Related U.S. Application Data

(63) Continuation of application No. 16/670,724, filed on Oct. 31, 2019, now Pat. No. 11,184,389.

(51) Int. Cl.
*H04L 9/40* (2022.01)
*H04L 9/32* (2006.01)
(Continued)

(52) U.S. Cl.
CPC ........ *H04L 63/1466* (2013.01); *H04L 9/3239* (2013.01); *H04L 47/286* (2013.01); *H04L 67/02* (2013.01); *H04L 67/12* (2013.01)

(58) Field of Classification Search
CPC ..... H04L 63/1466; H04L 63/12; H04L 63/20; H04L 9/3239; H04L 47/286; H04L 67/02; H04L 67/12; H04L 2209/805

See application file for complete search history.

(56) References Cited

U.S. PATENT DOCUMENTS 10,277,400 B1 4/2019 Griffin
10,666,523 B2 5/2020 Dawes et al.
(Continued)

FOREIGN PATENT DOCUMENTS

CN 106575400 A 4/2017

OTHER PUBLICATIONS

Application No. EP20882406.0, Extended European Search Report, Mailed On Nov. 18, 2022, 7 pages.
(Continued)

*Primary Examiner* — Vu V Tran
(74) *Attorney, Agent, or Firm* — Kilpatrick Townsend & Stockton LLP

(57) ABSTRACT

Embodiments include apparatuses, methods, and systems for managing security of a communication network. A message, formatted based on a stateless communication protocol for a communication network, may be received from a first computing device and by a second computing device. The second computing device generates a fingerprint of the message based on at least a portion of a header of the message or a portion of a body of the message. In addition, the second computing device detects whether the generated fingerprint of the message has a duplicated fingerprint already stored in the storage device, where the message is a retried message or replayed message of a message having the duplicated fingerprint. In embodiments, the fingerprint may be generated using a hash function based on the message.

20 Claims, 7 Drawing Sheets

(51) Int. Cl.
*H04L 47/28* (2022.01)
*H04L 67/02* (2022.01)
*H04L 67/12* (2022.01)

(56) References Cited

U.S. PATENT DOCUMENTS

| | | | |
|---|---|---|---|
| 2003/0061337 A1* | 3/2003 | Sato | H04L 69/329 |
| | | | 709/223 |
| 2017/0149819 A1 | 5/2017 | Androulaki | |
| 2018/0121298 A1 | 5/2018 | Johnson et al. | |
| 2019/0036766 A1 | 1/2019 | Popov | |
| 2019/0068376 A1* | 2/2019 | Kong | H04L 9/3231 |
| 2019/0182051 A1 | 6/2019 | Benson | |
| 2019/0246160 A1* | 8/2019 | Williams | H04N 21/63345 |
| 2020/0090167 A1* | 3/2020 | Cole | G06Q 20/223 |
| 2020/0145435 A1* | 5/2020 | Chiu | G06F 18/23 |

OTHER PUBLICATIONS

Application No. CN202080073945.X, Office Action, Mailed On Jul. 12, 2023, with English Translation, 18 pages.
U.S. Appl. No. 16/670,724, Notice of Allowance, Mailed On Aug. 19, 2021, 12 pages.
Application No. PCT/US2020/056372, International Search Report and Written Opinion, Mailed On Jan. 25, 2021, 9 pages.
Application No. CN202080073945.X, Notice of Decision to Grant, Mailed On Feb. 8, 2024, with English Translation, 4 pages.

* cited by examiner

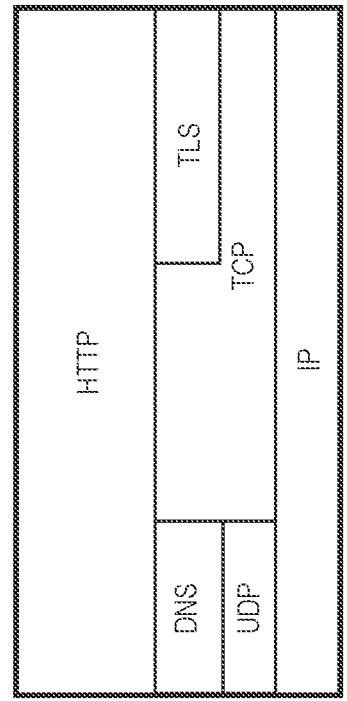
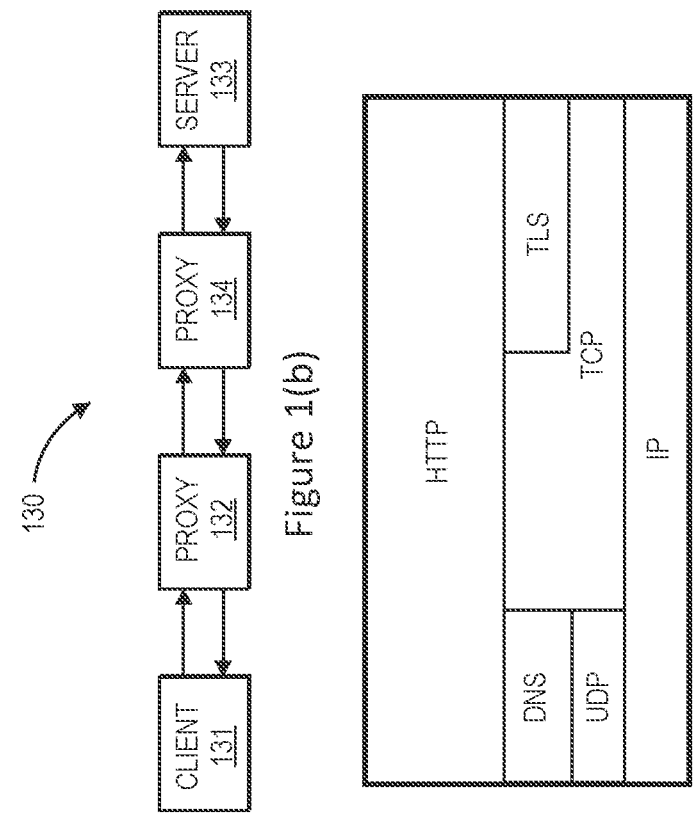
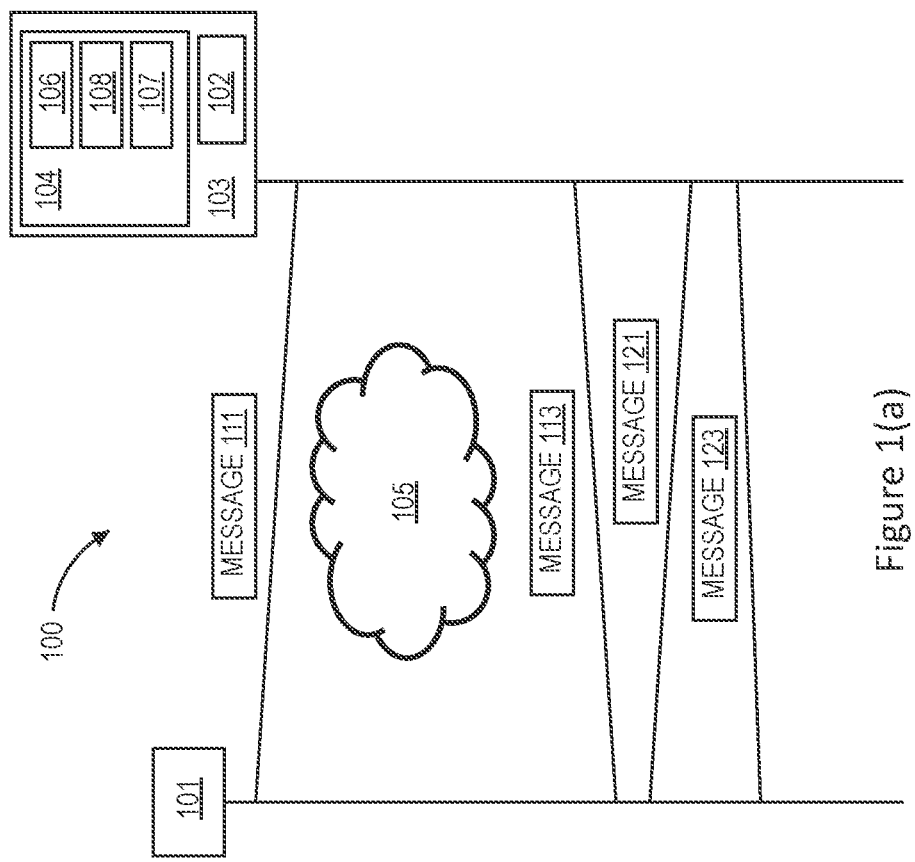
Figure 1(a)
Figure 1(b)
Figure 1(c)

RequestURI||RequestHttpMethod||RequestBody||AllRequestHeaderNamesInSortedCsvFormat||
SelectedRequestHeaderValuesInSortedCsvFormat

SECURITY MECHANISMS FOR PREVENTING RETRY OR REPLAY ATTACKS

CROSS-REFERENCE TO RELATED APPLICATIONS

This application is a continuation of U.S. application Ser. No. 16/670,724, filed Oct. 31, 2019, the entire disclosure of which is incorporated herein by reference.

BACKGROUND

A network, e.g., a computer, communications, or data network, includes a collection of components, e.g., terminal nodes or computing devices, switches, routers, connected by links to enable communication between the terminals or computing devices. Networks are used extensively throughout the world to connect individuals and organizations, to make ecommerce possible. A communication protocol is a system of rules that allow two or more entities of a communications network or system to transmit information via any kind of variation of a physical quantity. The Internet is the best example of many data networks from different organizations all operating under a single address space. Terminals attached to transmission control protocol/Internet protocol (TCP/IP) networks are addressed using IP addresses specified by IP protocols. Protocols may be implemented by hardware, software, or a combination of both. Communicating systems use well-defined formats for exchanging various messages according to the protocols. Each message has an exact meaning intended to elicit a response from a range of possible responses pre-determined for that particular situation. Communications security is the discipline of preventing unauthorized interceptors from accessing a computer system or a communication network, while still delivering content to the intended recipients. With the wide spread use of Internet, ecommerce, and other applications, network or communication security is facing more and more challenges.

BRIEF SUMMARY

Embodiments include apparatuses, methods, and systems for managing security of a communication network. A message, formatted based on a stateless communication protocol for a communication network, may be received from a first computing device and by a second computing device. The second computing device generates a fingerprint of the message based on at least a portion of a header of the message or a portion of a body of the message. In addition, the second computing device detects whether the generated fingerprint of the message has a duplicated fingerprint already stored in the storage device, where the message is a retried message or replayed message of a message having the duplicated fingerprint. In embodiments, the fingerprint may be generated using a hash function that is based on the message.

Embodiments disclosed herein include an executable software product stored on a non-transitory computer-readable medium containing program instructions that cause a processor of a computing device, in response to execution of the instructions by the processor, to perform a sequence of operations. In detail, the processor of the computing device is caused, in response to execution of the instructions by the processor, to receive a message formatted based on a stateless communication protocol for the communication network; and generate, based on a hash function stored in a storage device coupled to the processor, a fingerprint of the message. The fingerprint is generated using the hash function based on at least a portion of a header of the message or a portion of a body of the message. In addition, the processor is caused, in response to execution of the instructions by the processor, to store the generated fingerprint of the message in the storage device; and detect, by the processor, whether the generated fingerprint of the message has a duplicated fingerprint already stored in the storage device, where the message is a retried message or replayed message of a message having the duplicated fingerprint.

Embodiments disclosed herein include a computing device including a storage to store a hash function, and one or more processors coupled to the storage. The one or more processors are configured to receive, from another computing device coupled to the computing device by a communication network, a message formatted based on a stateless communication protocol for the communication network. The one or more processors are further configured to generate a fingerprint of the message using the hash function based on at least a portion of a header of the message or a portion of a body of the message; and store the generated fingerprint of the message in the storage device. In addition, the one or more processors are further configured to detect whether the generated fingerprint of the message has a duplicated fingerprint already stored in the storage device, where the message is a retried message or replayed message of a message having the duplicated fingerprint.

BRIEF DESCRIPTION OF SEVERAL VIEWS OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIGS. 1(a)-1(f) illustrate example systems, communication protocol stacks, messages, and processes to manage security mechanism of a communication network, in accordance with various embodiments.

DETAILED DESCRIPTION

Figures 1D, 1E:
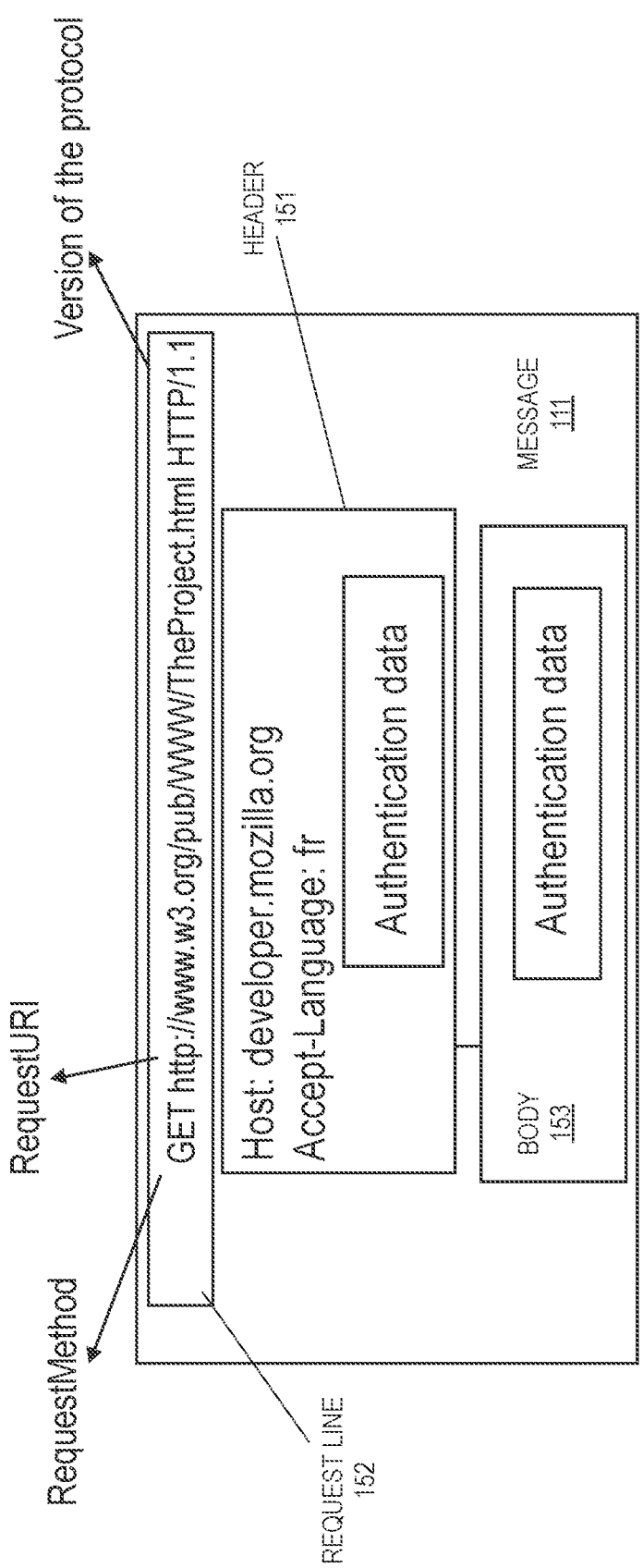
Figure 1F:
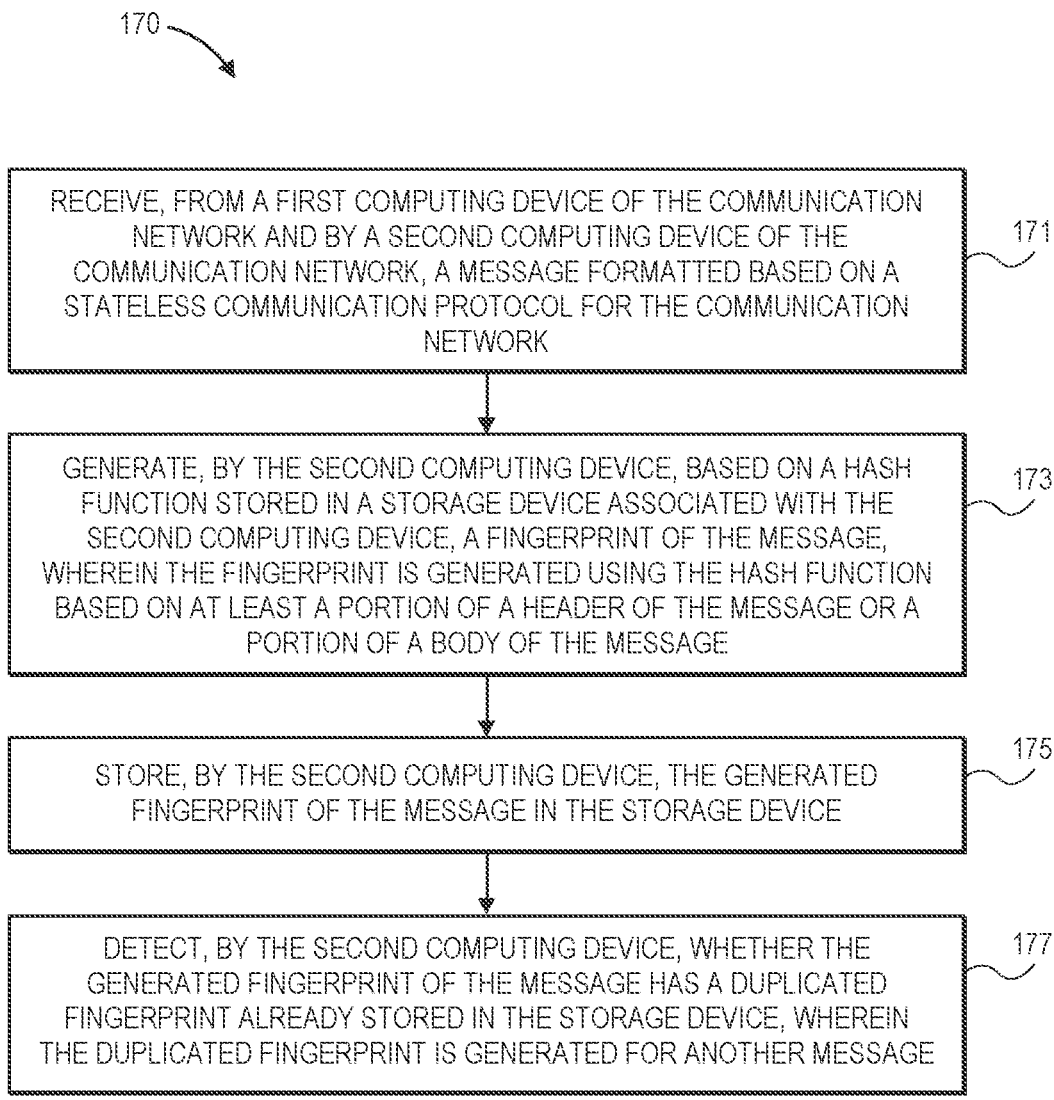

The following description is presented to enable one of ordinary skill in the art to make and use the embodiments and is provided in the context of a patent application and its requirements. Various modifications to the exemplary embodiments and the generic principles and features described herein will be readily apparent. The exemplary embodiments are mainly described in terms of particular methods and systems provided in particular implementations. However, the methods and systems will operate effectively in other implementations. Phrases such as "exemplary embodiment", "one embodiment" and "another embodiment" may refer to the same or different embodiments. The embodiments will be described with respect to systems and/or devices having certain components. However, the systems and/or devices may include more or less components than those shown, and variations in the arrangement and type of the components may be made without departing from the scope of the current disclosure. Various embodiments will also be described in the context of particular methods having certain steps. However, the method and system operate effectively for other methods having different and/or additional steps and steps in different orders that are not inconsistent with the presented embodiments. Thus, the current disclosure is not intended to be limited to the embodiments shown, but is to be accorded the widest scope consistent with the principles and features described herein.

A communication network, or a computer network, includes a collection of components, e.g., computing devices, connected by links to enable communication between the computing devices following one or more communication protocols. With the wide spread use of communication networks, computer security, communications security, or network security is of foremost importance. Embodiments herein may refer to network security, which may also include computer security or communications security as understood by a person having ordinary skill in the art. In general, computer security or network security may include many subjects, e.g., cryptography, authentication, encryption, key management, various attacks and their preventions. Active attacks involve some modification of the data stream or the creation of a false stream and can be subdivided into four categories: replay, masquerade, modification of messages, and denial of service. A replay (also known as playback attack) is a form of network attack in which a valid data transmission is maliciously or fraudulently repeated or delayed. This is carried out either by the originator or by an adversary who intercepts the data and re-transmits it, possibly as part of a masquerade attack by Internet Protocol (IP) packet substitution. A replay is one of the lower tier versions of a "Man-in-the-middle attack." In addition, a retry may happen when a user initiates an action that results in a duplicate messages or similar messages being sent. A retry may be a kind of tool for other kinds of security attack. For example, multiple rounds of retry may lead to denial of service attack or the breach of the authentication.

Embodiments herein relate to security mechanisms for preventing retry or replay attacks in a computer network, which is a specific security attack, instead of the general network security. Furthermore, in embodiments, the messages being communicated in the communication network are formatted based on a stateless communication protocol for the communication network. In computing, a stateless protocol is a communications protocol in which no session information is retained by the receiver, usually a server. Every message can be understood in isolation, without context information or any knowledge of the messages that come before or after the message. Embodiments herein are related to specific improvements to the way computers, e.g., a computing device in a communication network, operate to provide security protections for retry or replay attacks based on stateless protocols for a communication network.

Embodiments herein provide the improved functionality for a computing device in a communication network to detect and prevent retry or replay attacks based on stateless protocols. Embodiments herein improve the efficiency of security protection for a computing device in a communication network. Retry or reply happens when a duplicated or similar messages are sent multiple times. A second message is a replay message of a first message when the second message is a duplicate message of the first message. A second message is a retry message of a first message when the second message is a similar message of the first message. For example, a second message is a retry message of a first message when the second message has a same message content, but with different header fields. Since it is a stateless protocol, currently there is no way to detect one message is same or similar to another message, because every message is understood in isolation, without context information or any knowledge of the messages that come before or after the message. In some current technology, a request identifier, e.g., a correlation identifier, may be used to tie one request message to another request message. However, within a chain of request message sharing a correlation identifier, current technology still cannot tell whether a request message is unique or a duplicated one. Hence, direct comparison of two messages to detect retry or replay attack is not possible. Embodiments herein generate a fingerprint for a message and detect the duplication of messages by detecting the duplication of fingerprints. In addition, embodiments herein improve the level of security protections for a computing device in a communication network. As a byproduct, embodiments herein may reduce risk for business organizations or companies that use communication networks.

FIGS. 1(a)-1(f) illustrate example systems, communication protocol stacks, messages, and processes to manage security mechanism of a communication network, in accordance with various embodiments. As shown in FIG. 1(a), a communication network 100 includes a first computing device 101 and a second computing device 103, where the communication network 100 includes a cloud network 105. As shown in FIG. 1(b), a communication network 130 includes a first computing device 131, a second computing device 133, a proxy 132, and a proxy 134. There may be many other components in the network 100 or the network 130, e.g., switches, routers, storage devices, not shown. Operations described herein for the network 100 are similarly applicable to the network 130.

Figure 2A:
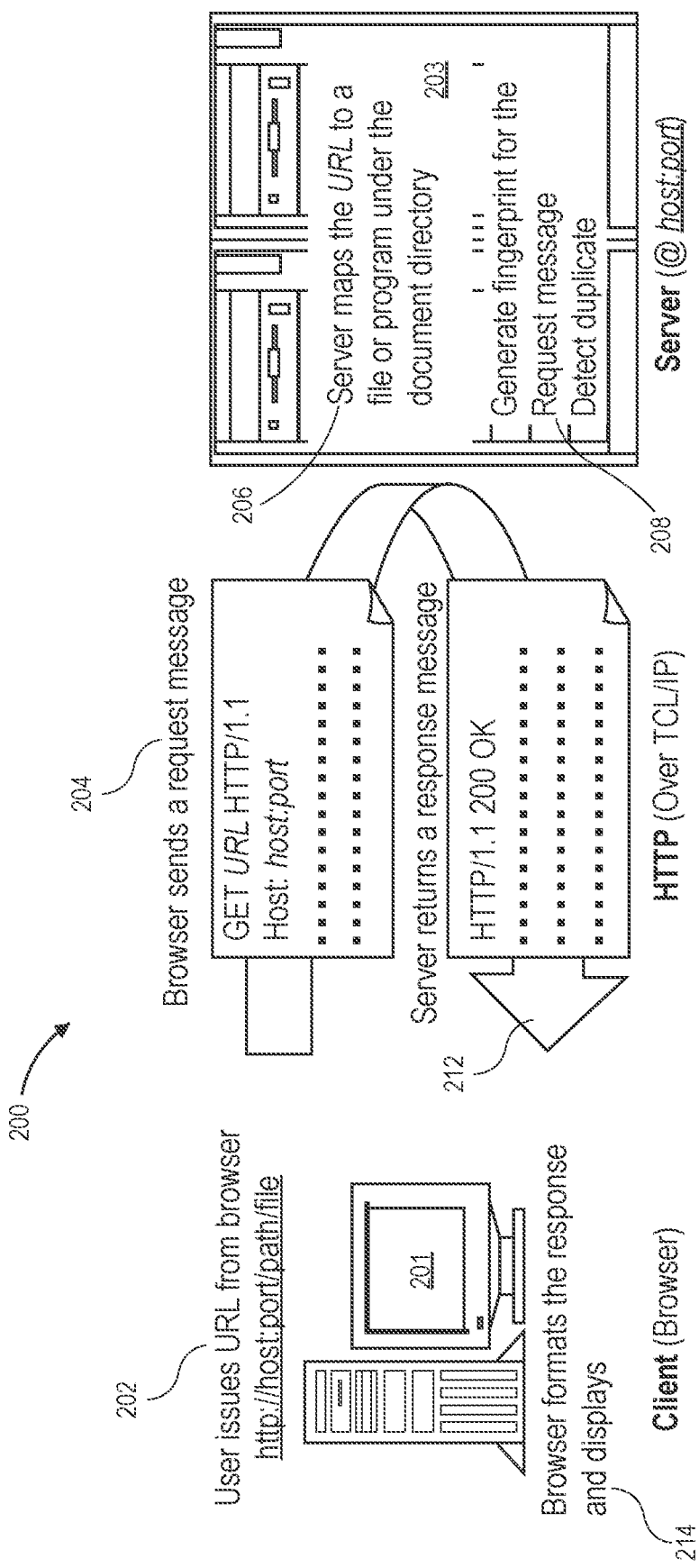
FIGS. 2(a)-2(c) illustrate example communication networks implementing the security mechanism, in accordance with various embodiments.
Figure 2B:
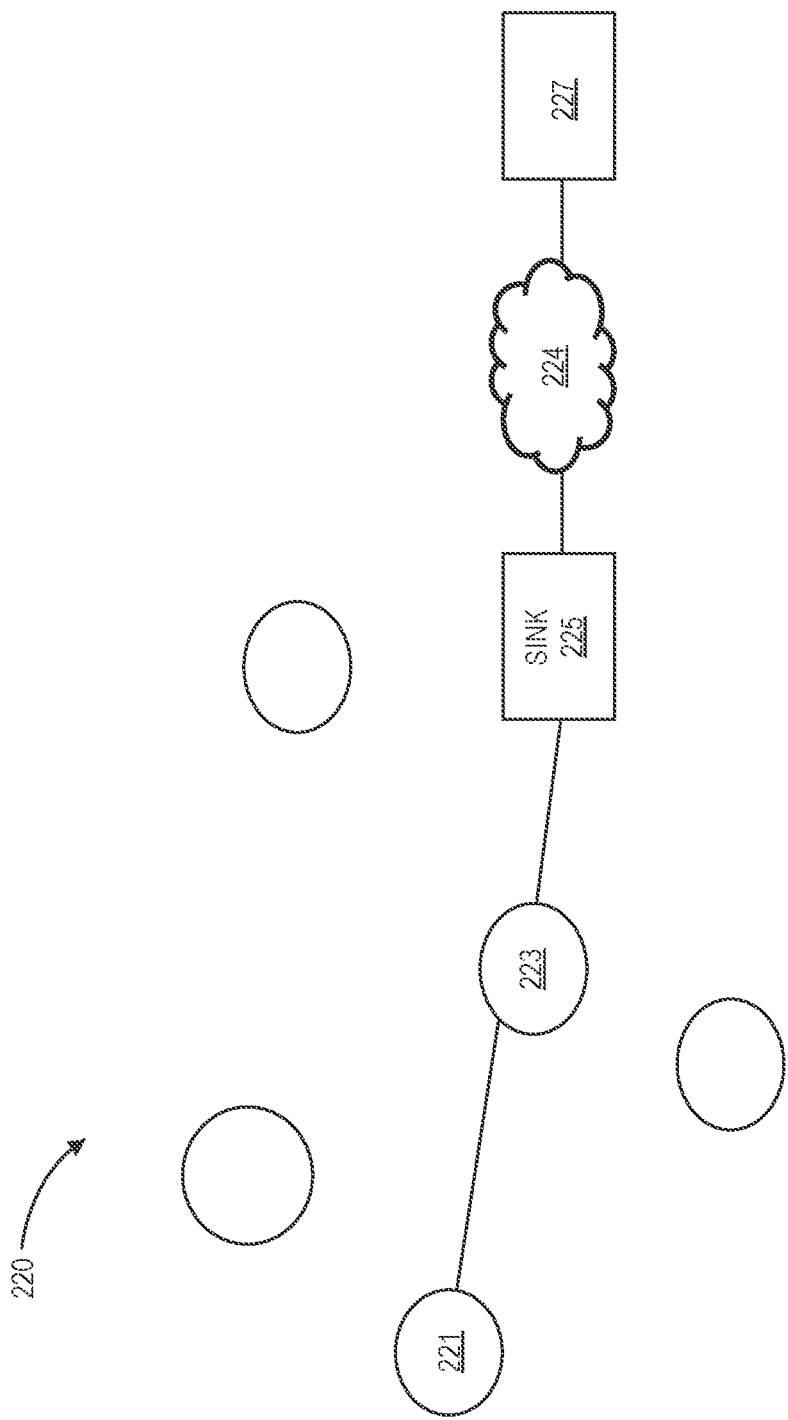
Figure 2C:
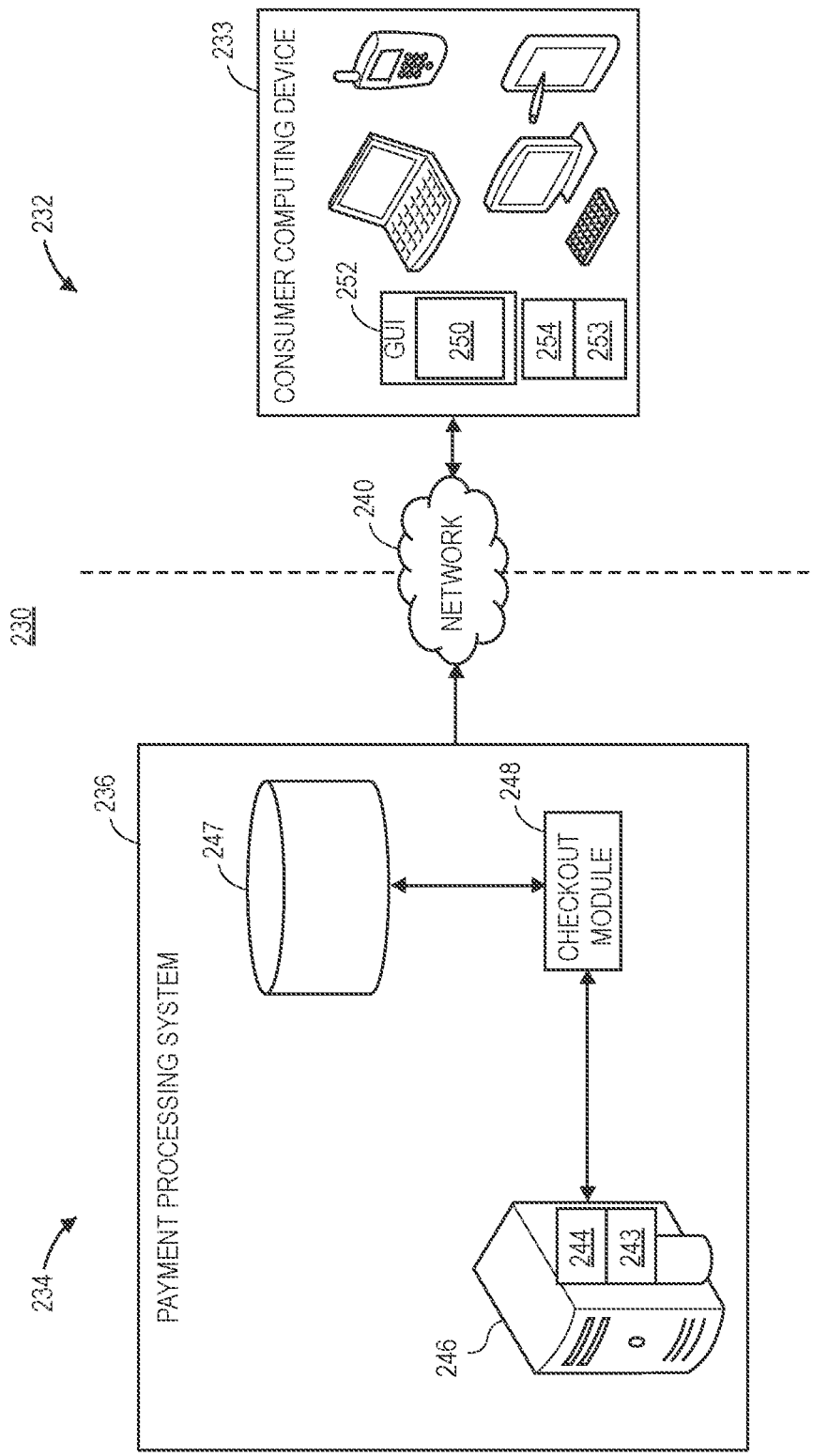

In embodiments, the communication network 100 or the communication network 130 can be various communication network, e.g., Internet, a sensor network, or an electronic payment transaction processing network, with more details shown in FIGS. 2(a)-2(c). In embodiments, the first computing device 101, the first computing device 131, the second computing device 103, or the second computing device 133 may include a smart phone, laptop, tablet, a personal computer, a server, a camera, a sensor, a router, a switch, an Internet of Thing (IoT) device, a point of sale (POS) terminal, or a transaction terminal.

In embodiments, the first computing device 101 or the second computing device 103 may include a storage device, and one or more processors coupled to the storage. For example, the second computing device 103 includes a storage device 104, and one or more processors, e.g., a processor 102, coupled to the storage 104. The storage device 104 stores a hash function 106. In embodiments, the hash function 106 may include SHA-256, SHA-224, SHA-384, SHA-512, or a secure hash algorithm. The hash function 106 may take a message or a letter string generated from the message as an input and produce an output of fixed number of bits. For example, when the hash function 106 is SHA-256, for any input message, the hash function 106 generates an output message of 256 bits.

In embodiments, the processor 102 of the second computing device 103 may be configured to receive, from the first computing device 101 through the communication network 100, a message 111 formatted based on a stateless communication protocol for the communication network 100. The message 111 may be a request message. In addition, the processor 102 may be configured to generate, a response message 113 to be sent to the first computing device 101. The message 111 and the message 113 may be a first request and a first response message. The first computing device 101 may further send a second request message 121 to the second computing device 103, and the second computing device 103 may further generate a second response message 123 to be sent to the first computing device 101. The message 111, the message 113, the message 121, and the message 123 may be formatted based on a stateless communication protocol for the communication network. Hence, the first computing device 101 and the second computing device 103 may not keep a session information about the communication between the first computing device 101 and the second computing device 103. The request message 121 is executed independently without any knowledge of the requests that came before it, e.g., the message 111. The first computing device 101 first sends the message 111 and the second computing device 103 responds with the message 113. When the first computing device 101 comes back with the message 121, the second computing device 103 treats the message 121 as from a different computing device or user, and has no idea that the message 121 is from the same computing device, the first computing device 101. In short, every request message is an independent request message for a stateless protocol. In some current technology, a request identifier, e.g., a correlation identifier, may be used to tie one request message to another request message. A correlation ID, also known as a transit ID, is a unique identifier value that is attached to requests and messages that allow reference to a particular transaction or event chain. For example, the message 111 is one of a set of multiple messages that include both the message 111 and the message 121 sharing a same correlation identification. However, within a chain of request message sharing a correlation identifier, current technology still cannot tell whether a request message is unique or duplicated ones. For example, a request message may be a retried message that previously failed.

In embodiments, the stateless communication protocol for the message 111 or the message 121 may include Hyper Text Transfer Protocol (HTTP), HTTP/1.1, HTTP/2, HTTP/3, HTTPS, Internet Protocol (IP), a stateless sensor network protocol, or any other stateless communication protocol. As shown in FIG. 1(c), a HTTP protocol, which may be any of HTTP, HTTP/1.1, HTTP/2, HTTP/3, HTTPS, is an application layer protocol above the TCP and IP layer. A HTTP protocol is a protocol that allows the fetching of resources, such as HTML documents. It is the foundation of any data exchange on the Web and it is a client-server protocol, which means requests are initiated by the recipient, usually the Web browser. A complete document is reconstructed from the different sub-documents fetched, for instance text, layout description, images, videos, scripts, and more.

There may be various retries or replays related to the HTTP protocol. User retries happen when a user initiates an action that results in a duplicate HTTP request message being transmitted. For example, a user retry might occur when a "reload" button is pressed, a URL is typed in again, "return" is pressed in the URL bar again, or a navigation link or form button is pressed twice while still on screen. Automatic retries happen when an HTTP client implementation resends a previous request message without user intervention or initiation. This might happen when a GET request fails to return a complete response, or when a connection drops before the request is sent. Automatic retries may be performed both by user agents and intermediary clients. Replays happen when the underlying transport units (e.g., TCP packets, QUIC frames) containing a HTTP request message are re-sent on the network and appear to be separate requests to the downstream server, either automatically as part of transport protocol operation, or by an attacker. The upstream HTTP client might not have any indication that a replay has occurred.

The message 111 may be a message based on a HTTP protocol, an IP protocol, or other stateless protocol. As shown in FIG. 1(d), when the message 111 is a HTTP message, the message 111 may include a method name, a path or a request URI, a version of the protocol, a header, and a body. The method may include GET, HEAD, POST, OPTIONS, PUT, DELETE, TRACE, CONNECT, or PATCH in a HTTP related protocol, and the message 111 may be a message for GET, HEAD, POST, OPTIONS, PUT, DELETE, TRACE, CONNECT, or PATCH. The message 111 may include a general-header, a client request-header, or an entity-header. The header may include a field for date, a time to live (TTL) filed, or a correlation identification field to specify certain relationship of the message with other messages. In addition, the body or the header may include authentication data.

In more detail, when the message 111 is a HTTP message, the message 111 includes the following format: a request-line 152, a header 151 including zero or more header fields followed by carriage return line feed (CRLF), an empty line indicating the end of the header fields, and optionally a message-body 153. The request-line begins with a method token (RequestMethod), followed by the request-uniform resource identifier (URI), a protocol version, and ending with CRLF. The elements are separated by space (SP) characters. For example, a request line is of the format: "Method SP Request-URI SP HTTP-Version CRLF." The request method indicates the method to be performed on the resource identified by the given Request-URI. The Request-URI identifies the resource upon which to apply the request. A HTTP header includes HTTP header fields providing information about the request or response, or about the object sent in the message body. There are four types of HTTP message headers: general-header, client request-header, server response-header, and entity-header. A general-header includes header fields have general applicability for both request and response messages. A client request-header includes header fields applicable only for request messages. A server response-header includes header fields applicable only for response messages. An entity-header includes header fields defining meta information about the entity-body or, if no body portion is present, about the resource identified by the request. For example, a header may include the following head fielders: Accept-Charset, Accept-Encoding, Accept-Language, Authorization, Expect, From, Host, and more. The Authorization request-header field value, of the form Authorization: credentials, includes credentials containing the authentication information of the user agent for the realm of the resource being requested. The Host header field is used to specify the Internet host and the port number of the resource being requested. There are many more detailed header fields not shown or described herein, but are known to a person having ordinary skill of the arts.

In embodiments, the processor 102 is configured to generate a fingerprint 108 of the message 111 using the hash function 106 based on at least a portion of a header of the message 111 or a portion of a body of the message 111. As shown in FIG. 1(e), the fingerprint 108 may be generated based on a string 154 including part of the message header or body information, RequestURI‖RequestHttpMethod‖RequestBody||AllRequestHeaderNamesInSortedCsv Format||ISelectedRequestHeaderValuesInSortedCsvFormat. The RequestURI and RequestHttpMethod are from the request line 152, The RequestBody is from the body 153. The AllRequestHeaderNamesInSortedCsvFormat||SelectedRequestHeaderValuesInSortedCsvFormat may include all or some selected header fields from the header 151. The components of the string 154 are selected from the message 111, the header 151, the request line 152, or the body 153. However, the string 154 may place the components in an order for retry or replay attack detection, which is an order different from the components shown in the message 111.

In some embodiments, the string 154 may include full request body, all header names, and all header values. A fingerprint generated based on such a string 154 can be used to detect replay attacks on requests, where a man in the middle attack has occurred and has replayed the entire request, including authentication data which may have a built in time to live (TTL). All header values are used in the fingerprint, including the correlation identifier. Fingerprint generated based on such a string 154 (including full request body, all header names, and all header values) may not detect where a client has retried a request due to the fact that they will likely create new authentication headers and the correlation identifier may differ.

In some embodiments, the string 154 may include full request body, all header names, selected non authentication data which are not date/timestamp driven. The fingerprint generated by such a string 154 can detect whenever a client has retried a request, due to it only looking at static values. However, some GET requests on a resource may likely have a same fingerprint due to limited static data points that differ. Various string 154 may be obtained from the message 111 for generating the fingerprint 108, which may have different advantages or disadvantages for detecting retry or replay attacks.

In addition, the processor 102 is configured to store the generated fingerprint 108 of the message 111 in the storage device 104. In some embodiments, the fingerprint 108 may be generated without using authentication data contained in the message 111. When a malicious user is attacking a server, the malicious user may keep changing the authentication data to gain access to the content on a server. Existing approaches would not be able to detect such retry attack with different authentication data. In addition, the storage device 104 also stores other fingerprints 107 generated for other messages. The processor 102 is further configured to detect whether the generated fingerprint 108 of the message 111 has a duplicated fingerprint in the stored fingerprints 107 in the storage device 104, where the duplicated fingerprint is generated for another message. If the processor 102 detects there is a duplicated fingerprint for the generated fingerprint 108, the message 111 may be a retry or replay message of another message that generates the duplicated fingerprint.

In embodiments, the processor 102 is further configured to generate the response message 113 for the message 111. When the processor 102 detects there is a duplicated fingerprint for the generated fingerprint 108, the processor 102 may generate a response message 113 to indicate a rejection of a service request. On the other hand, when the processor 102 does not detect a duplicated fingerprint for the generated fingerprint 108, the processor 102 may generate a response message 113 as a normal response without the security mechanism described herein.

FIG. 1(*f*) illustrates an example process 170 to manage security mechanism of the communication network 100. The process 170 may be performed by the processor 102 of the second computing device 103.

In embodiments, at an interaction 171, the processor 102 receives, from a first computing device through a communication network, a message formatted based on a stateless communication protocol for the communication network. For example, the processor 102 receives, from the first computing device 101 through the communication network 100, the message 111 formatted based on a stateless communication protocol for the communication network 100.

In embodiments, at an interaction 173, the processor 102 generates, based on a hash function stored in a storage device associated with the second computing device, a fingerprint of the message, where the fingerprint is generated using the hash function based on at least a portion of a header of the message or a portion of a body of the message. For example, the processor 102 generates, based on the hash function 106 stored in the storage device 104, the fingerprint 108 of the message 111. As described above, the fingerprint 108 is generated using the hash function 106 based on the sting 154 formed by at least a portion of a header of the message 111 or a portion of a body of the message 111.

In embodiments, at an interaction 175, the processor 102 stores the generated fingerprint of the message in the storage device. For example, the processor 102 stores the generated fingerprint 108 of the message 111 in the storage device 104.

In embodiments, at an interaction 177, the processor 102 detects whether the generated fingerprint of the message has a duplicated fingerprint already stored in the storage device, where the duplicated fingerprint is generated for another message. For example, the processor 102 detects whether the generated fingerprint 108 of the message 111 has a duplicated fingerprint already stored in the storage device 104, where the duplicated fingerprint is generated for another message.

As shown above, the operations and interactions involved in the process 170 are not simply storing, organizing, and retrieving operations in a storage device, neither are they merely concept of organizing information. Instead, the operations and interactions involved in the process 170 detects duplicated messages, which may be a retry or replay attack.

In some embodiments, the processor 102 may also generate a response message to indicate a rejection of a service request when the processor 102 detects the duplicated fingerprint already stored in the storage device. For example, the processor 102 generates the message 113 to indicate a rejection of a service request when the processor 102 detects the duplicated fingerprint already stored in the storage device 104.

FIGS. 2(*a*)-2(*c*) illustrate example communication networks implementing the security mechanism. FIG. 2(*a*) illustrates a client, e.g., a web browser, operating on a first computing device 201 to communicate with a server, e.g., a second computing device 203, through the internet 200. The first computing device 201, the second computing device 203, and the internet 200 are an example of the first computing device 101, the second computing device 103, and the network 100 shown in FIG. 1(*a*).

In embodiments, at an interaction 202, a user issues an URL from a web browser operating on the first computing device 201. At an interaction 204, the browser sends a request message to the server 203. At an interaction 206, the server 203 receives the URL in the request message and maps the URL to a file or program specified by the URL. In addition, at interaction 208, before the server 203 sends a response message, the server 203 generates a fingerprint for the request message received at the interaction 206, and further detects whether a duplicated fingerprint has been generated before and stored in the server 203. The operations performed during the interaction 208 is an additional step not occurring at a normal HTTP request and response operation flow. The additional step performed in the interaction 208 provides added security for the server 203 to detect retry or replay attacks. At an interaction 212, the server 203 may return different response messages depending on whether a duplicated fingerprint is found. If a duplicated fingerprint is found during the interaction 208, the server 203 may send a response message to indicate a rejection of a service request. If no duplicated fingerprint is found, the server 203 may send a normal response message to the request URL. At an interaction 214, the browser may format and display the received response message from the server 203.

The additional operations performed in the interaction 208 provide added security for the server 203 to detect retry or replay attack, so that the server 203 has improved functionality to detect and prevent retry or replay attacks based on stateless protocols. The detection of duplicated fingerprints is different from other kinds of checking for existing of a message of information. For example, an authentication operation performs inspection of data to see whether a user provided information exists in a user database. However, the authentication data is not provided by a fingerprint of a message. In addition, the database for authentication includes data provided by a user that associate the user to the data. The detection of duplicated fingerprints is based on messages, without any knowledge about any user. Operations performed on interaction 208 are not routine operations, due to the simple fact that no HTTP messages perform this step before since HTTP protocol was invented many years ago.

In embodiments, the server 203 may further implement a mechanism to store only a limited amount of fingerprints. For example, the server 203 may only store fingerprints of 1 million messages, 1 billion messages, or messages generated during a predetermined amount of time, e.g., one day or one week.

FIG. 2(b) illustrates a sensor network 220 including various sensor nodes, e.g., a sensor 221, and a sensor 223. The sensor 221, the sensor 223, and the sensor network 220 are an example of the first computing device 101, the second computing device 103, and the network 100 shown in FIG. 1(a). Messages may be communicated between the sensor 221 and the sensor 223, similar to the message sequence shown in FIG. 1(a) for the first computing device 101 and the second computing device 103. For example, the sensor 223 may receive from the sensor 221 a message formatted based on a stateless communication protocol for the sensor network 220, generate a fingerprint of the message based on a hash function stored in a storage device of the sensor 223. The fingerprint is generated using the hash function based on at least a portion of a header of the message or a portion of a body of the message. The sensor 223 may store the generated fingerprint of the message in the storage device, and detect whether the generated fingerprint of the message has a duplicated fingerprint already stored in the storage device, wherein the duplicated fingerprint is generated for a retried message or replayed message.

In addition, the sensor network 220 may also include a sink node 225, which may be coupled to a controller 227 through another network 224, e.g., the Internet. The sensor network 220 may refer to a group of spatially dispersed and dedicated sensors for monitoring and recording the physical conditions of the environment and organizing the collected data at a central location. For example, the sensor network 220 may measure environmental conditions like temperature, sound, pollution levels, humidity, wind, and so on. The sensor network 220 may be used in wide variety of everyday life activities and services which includes tracking and monitoring of events in various areas. Some of its applications are military uses of sensors to detect enemy intrusion, environment monitoring (for example—forest fire detection), patient monitoring in health care sectors etc.

FIG. 2(c) illustrates a client, e.g., a web browser, operating on a first computing device 233 to communicate with a second computing device 236 in an electronic payment transaction processing network 230. The first computing device 233, the second computing device 236, and the electronic payment transaction processing network 230 are an example of the first computing device 101, the second computing device 103, and the network 100 shown in FIG. 1(a).

In embodiments, the electronic payment transaction processing network 230 may include front end components 232 (e.g., a user or customer computing device 233 such as a smart phone, a personal computer, tablet, etc.) and backend components 234 (e.g., a payment processing system 236 and a marketing documents system, not shown). The front end components 232 and backend components 234 may be in communication with each other via a communication link 240 (e.g., computer network, internet connection, etc.). The electronic payment transaction processing network 230 may include various software or computer-executable instructions and unique hardware components or modules that may employ the software and instructions to manage payment processing, security of a communication network, and other information and dynamic objects as described herein. The various modules may be implemented as computer-readable storage memories containing computer-readable instructions (i.e., software) for execution by a processor of the electronic payment transaction processing network 230 within a specialized or unique computing device.

A data repository 247 may include consumer account data profiles that each include various pieces of data to describe an account of a payment device owner and user of the payment processing system 236.

A checkout module 248 may include various instructions that, upon execution by the processor 244, facilitate a user employing a payment device for a financial transaction. The checkout module 248 may include instructions that, upon loading into the server memory 243 and execution by one or more computer processors 244, allow the user to employ the payment device and his or her corresponding account data stored with the 247 to complete a payment. In some embodiments, the checkout module 248 may include instructions to process payments during an online financial transaction between the consumer computing device 233 and an online merchant. For example, the checkout module 248 may include instructions to access account data in 247 corresponding to the consumer initiating the transaction and approve or deny a payment amount to a merchant via the network 240. The checkout module may also include instructions to coordinate execution of instructions to cause an application executing on the user computing device 233 to display the dynamic button object 250 within a Graphical User Interface ("GUI") 252 of the user computing device 233. In some embodiments, the GUI 252 may include a browser or other application stored in a memory 253 and executed on a processor 254 of the computing device 233 to display the dynamic button object 250.

Messages may be communicated between the first computing device 233 and the second computing device 236, similar to the message sequence shown in FIG. 1(a) for the first computing device 101 and the second computing device 103. For example, the second computing device 236 may receive from the first computing device 233 a message formatted based on a stateless communication protocol for the electronic payment transaction processing network 230, generate a fingerprint of the message based on a hash function stored in the memory 253 of the second computing device 236. The fingerprint is generated using the hash function based on at least a portion of a header of the message or a portion of a body of the message. The second computing device 236 may store the generated fingerprint of the message in the memory 253, and detect whether the generated fingerprint of the message has a duplicated fingerprint already stored in the memory 253, wherein the duplicated fingerprint is generated for a retried message or replayed message. In some embodiments, the messages communicated between the first computing device 233 and the second computing device 236 may be based on HTTP protocols.

Figure 3:
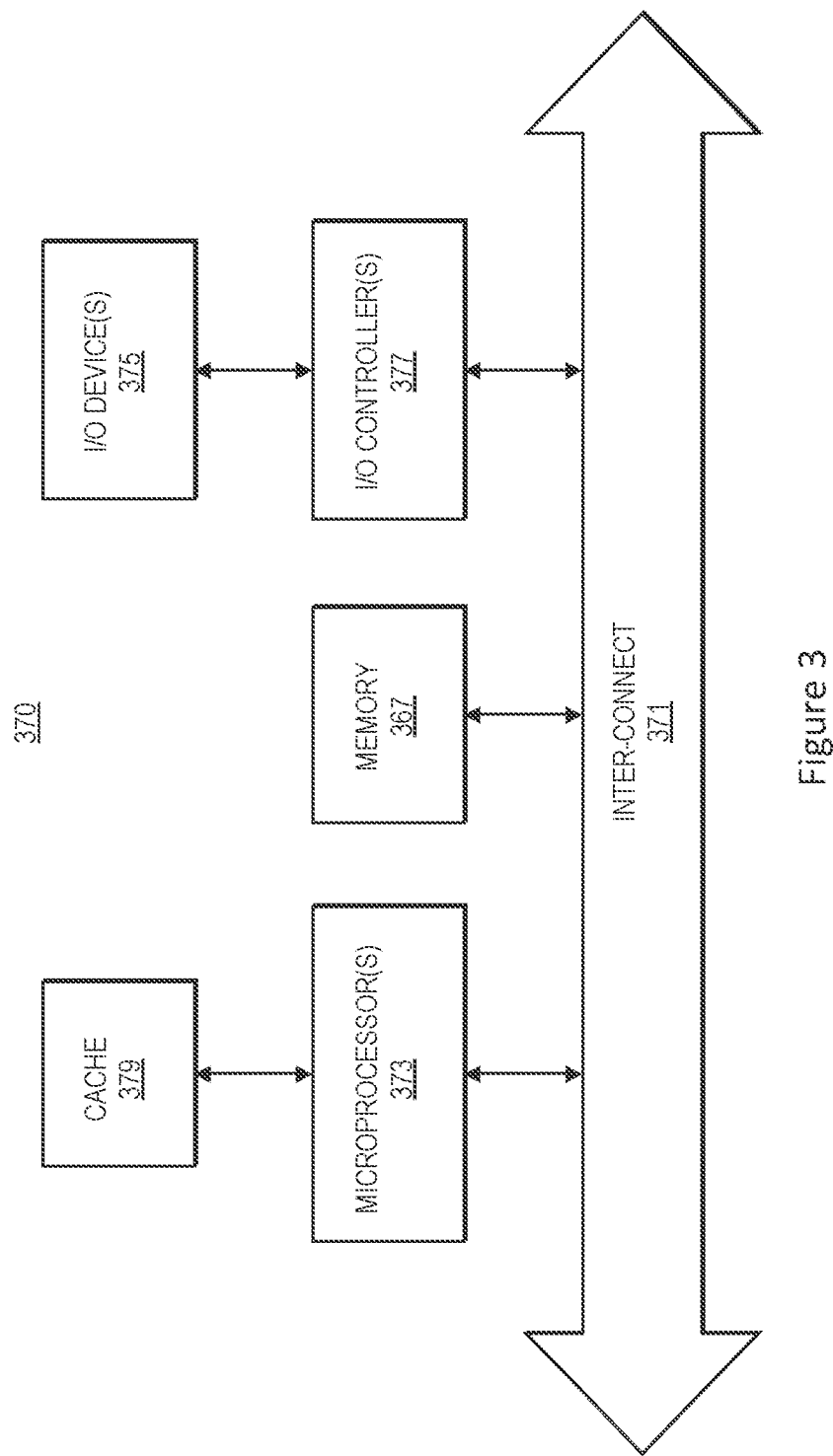
FIG. 3 illustrates an example device suitable for use to practice various aspects of the present disclosure, in accordance with various embodiments.

FIG. 3 illustrates an example device suitable for use to practice various aspects of the present disclosure, in accordance with various embodiments. While FIG. 3 illustrates various components of a computer system, it is not intended to represent any particular architecture or manner of interconnecting the components. One embodiment may use other systems that have fewer or more components than those shown in FIG. 3.

In FIG. 3, the data processing system 370 includes an inter-connect 371, e.g., bus and system core logic, which interconnects a microprocessor(s) 373, memory 367, and input/output (I/O) device(s) 375 via I/O controller(s) 377. The microprocessor 373 is coupled to cache memory 379. I/O devices 375 may include a display device and/or peripheral devices, such as mice, keyboards, modems, network interfaces, printers, scanners, video cameras and other devices known in the art. In one embodiment, when the data processing system is a server system, some of the I/O devices 375, such as printers, scanners, mice, and/or keyboards, are optional.

In one embodiment, the inter-connect 371 includes one or more buses connected to one another through various bridges, controllers and/or adapters. In one embodiment, the I/O controllers 377 include a USB (Universal Serial Bus) adapter for controlling USB peripherals, and/or an IEEE-1394 bus adapter for controlling IEEE-1394 peripherals.

In one embodiment, the memory 367 includes one or more of: ROM (Read Only Memory), volatile RAM (Random Access Memory), and non-volatile memory, such as hard drive, flash memory, etc. Volatile RAM is typically implemented as dynamic RAM (DRAM), which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory may also be a random access memory. The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In this description, some functions and operations are described as being performed by or caused by software code to simplify description. That is, the techniques may be carried out in a computer system or other data processing system in response to its processor, such as a microprocessor, executing sequences of instructions contained in a memory, such as ROM, volatile RAM, non-volatile memory, cache or a remote storage device.

Alternatively, or in combination, the functions and operations as described here can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While one embodiment can be implemented in fully functioning computers and computer systems, various embodiments are capable of being distributed as a computing product in a variety of forms and are capable of being applied regardless of the particular type of machine or computer-readable media used to actually effect the distribution.

In embodiments, a storage medium may contain instructions for practicing methods described with references to FIGS. 1-3, in accordance with various embodiments. In some embodiments, non-transitory computer-readable storage medium may include a number of programming instructions. Programming instructions may be configured to enable a device, e.g., the device 370, in response to execution of the programming instructions, to perform, e.g., various operations associated with managing security of a communication network, e.g., the communication network 100, the first communication device 101, the second communication device 103, the process 170, the first communication device 201, the second communication device 203, the sensor 221, the sensor 223, the first computing device 233, or the second computing device 236, as shown in FIGS. 1(a)-2(c).

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

The non-transitory computer-readable storage medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

The description and drawings are illustrative and are not to be construed as limiting. The present disclosure is illustrative of disclosed features to enable a person skilled in the art to make and use the techniques. Various features, as described herein, should be used in compliance with all current and future rules, laws and regulations related to privacy, security, permission, consent, authorization, and others. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

We claim:

1. A computer-implemented method for managing security of a communication network, comprising:
   receiving, from a first computing device of the communication network and by a second computing device of the communication network, a message formatted based on a stateless communication protocol for the communication network;
   generating, by the second computing device a fingerprint of the message based on at least a portion of a header of the message or a portion of a body of the message;
   storing, by the second computing device, the fingerprint of the message in a storage device associated with the second computing device; and
   detecting, by the second computing device, whether the fingerprint of the message has a duplicated fingerprint already stored in the storage device, wherein the message is a retried message or replayed message of a second message having the duplicated fingerprint.

2. The method of claim 1, further comprising:
   generating, by the second computing device, a response message to indicate a rejection of a service request contained in the message when the second computing device detects the duplicated fingerprint already stored in the storage device.

3. The method of claim 1, wherein the fingerprint is generated using a hash function based on the at least a portion of the header of the message or the portion of the body of the message, wherein the hash function includes SHA-256, SHA-224, SHA-384, SHA-512, or a secure hash algorithm.

4. The method of claim 1, wherein the stateless communication protocol includes Hyper Text Transfer Protocol (HTTP), HTTP/1.1, HTTP/2, HTTP/3, HTTPS, Internet Protocol (IP), or a stateless sensor network protocol.

5. The method of claim 1, wherein the communication network includes Internet, a sensor network, or an electronic payment transaction processing network.

6. The method of claim 1, wherein the message is a request message for GET, HEAD, POST, OPTIONS, PUT, DELETE, TRACE, CONNECT, or PATCH in a HTTP related protocol.

7. The method of claim 1, wherein the message includes a general-header, a client request-header, or an entity-header.

8. The method of claim 1, wherein the message includes the header and the body, and the header includes a field for date, a time to live (TTL) filed, or a correlation identification field, and the body or the header includes authentication data.

9. The method of claim 8, wherein the fingerprint is generated without using the authentication data contained in the message.

10. The method of claim 1, wherein the fingerprint is generated using a hash function on at least all fields of the header of the message.

11. The method of claim 1, wherein the first computing device or the second computing device includes a smart phone, laptop, tablet, a personal computer, a server, a camera, a sensor, a router, a switch, an Internet of Thing (IOT) device, a point of sale (POS) terminal, or a transaction terminal.

12. The method of claim 1, wherein the message is one of a set of multiple messages sharing a same correlation identification.

13. An executable software product stored on a non-transitory computer-readable medium containing program instructions that cause a processor of a computing device, in response to execution of the program instructions by the processor, to:
   receive a message formatted based on a stateless communication protocol for a communication network;
   generate a fingerprint of the message, wherein the fingerprint is generated based on at least a portion of a header of the message or a portion of a body of the message;
   store the fingerprint of the message in a storage device coupled to the processor; and
   detect, by the processor, whether the fingerprint of the message has a duplicated fingerprint already stored in the storage device, wherein the message is a retried message or replayed message of a second message having the duplicated fingerprint.

14. The executable software product of claim 13, wherein the program instructions further cause the processor to:
   generate, by the processor, a response message to indicate a rejection of a service request contained in the message when the computing device detects the duplicated fingerprint already stored in the storage device.

15. The executable software product of claim 13, wherein the fingerprint is generated using a hash function that based on the at least a portion of the header of the message or the portion of the body of the message, wherein the hash function includes SHA-256, SHA-224, SHA-384, SHA-512, or a secure hash algorithm.

16. The executable software product of claim 13, wherein the stateless communication protocol includes Hyper Text Transfer Protocol (HTTP), HTTP/1.1, HTTP/2, HTTP/3, HTTPS, Internet Protocol (IP), or a stateless sensor network protocol; and
wherein the message is a request message for GET, HEAD, POST, OPTIONS, PUT, DELETE, TRACE, CONNECT, or PATCH in a HTTP related protocol.

17. The executable software product of claim 13, wherein the communication network includes Internet, a sensor network, or an electronic payment transaction processing network.

18. A computing device, comprising:
a storage device;
one or more processors coupled to the storage device, wherein the one or more processors are configured to:
receive, from another computing device coupled to the computing device by a communication network, a message formatted based on a stateless communication protocol for the communication network;
generate a fingerprint of the message based on at least a portion of a header of the message or a portion of a body of the message;
store the fingerprint of the message in the storage device;
detect whether the fingerprint of the message has a duplicated fingerprint already stored in the storage device, wherein the message is a retried message or replayed message of a second message having the duplicated fingerprint; and
generate a response message to indicate a rejection of a service request contained in the message when the computing device detects the duplicated fingerprint already stored in the storage device.

19. The system computing device of claim 18, wherein the fingerprint is generated using a hash function that based on the at least a portion of the header of the message or the portion of the body of the message, and wherein the hash function includes SHA-256, SHA-224, SHA-384, SHA-512, or a secure hash algorithm;
the stateless communication protocol includes Hyper Text Transfer Protocol (HTTP), HTTP/1.1, HTTP/2, HTTP/3, HTTPS, Internet Protocol (IP), or a stateless sensor network protocol; and
the message is a request message for GET, HEAD, POST, OPTIONS, PUT, DELETE, TRACE, CONNECT, or PATCH in a HTTP related protocol.

20. The computing device of claim 18, wherein the fingerprint is generated without using authentication data contained in the message.

* * * * *